UNITED STATES PATENT OFFICE.

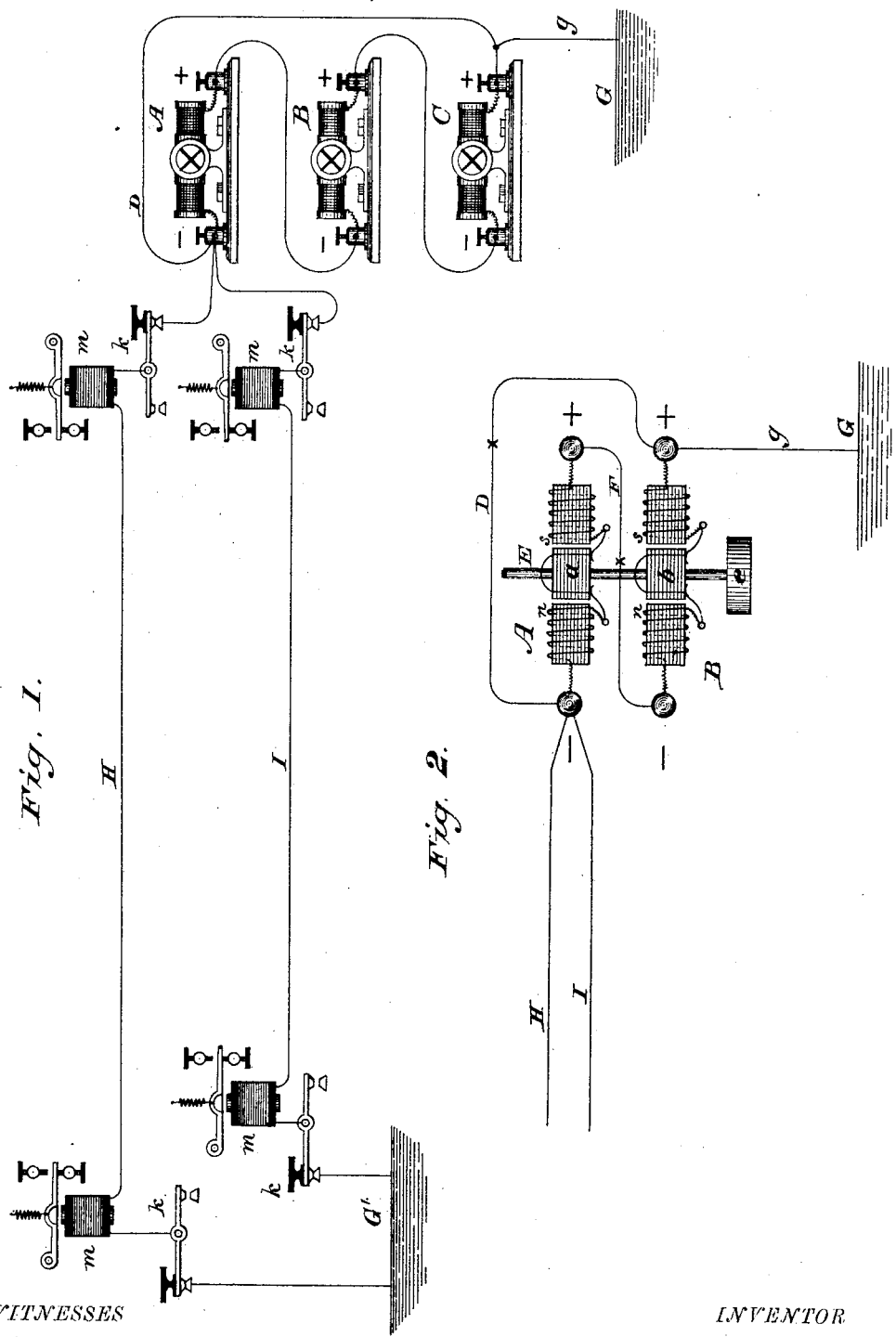

ORAZIO LUGO, OF NEW YORK, N. Y.

DYNAMO-ELECTRIC MACHINE.

SPECIFICATION forming part of Letters Patent No. 238,700, dated March 8, 1881.

Application filed January 18, 1881. (No model.)

*To all whom it may concern:*

Be it known that I, ORAZIO LUGO, a citizen of the United States, residing in the city, county, and State of New York, have invented certain new and useful Improvements in Dynamo-Electric Generators, of which the following is a specification.

In Letters Patent of the United States granted to me December 21, 1880, for improvements in dynamo-electric telegraphy, (No. 235,688,) I have described and shown an apparatus for producing electrical currents for telegraphic purposes, consisting of a dynamo-electric generator having a revolving armature-coil and stationary field-magnet included in the same circuit, a shunt-conductor connecting the opposite poles of the generator, and one or more electric circuits connected with said dynamo-electric generator and arranged in multiple arc with the said shunt-conductor.

My present invention relates to certain improvements in the apparatus described in said Letters Patent.

The object of the first part of my invention is to so combine two or more dynamo-electric generators that the action of each individual generator will assist in polarizing all the others, which end I attain by connecting two or more of said generators with each other in an endless series, the positive pole of one generator being connected with the negative pole of the next in the series, and so on continuously.

The object of the second part of my invention is to so arrange the respective resistances of the several parts of the system that the heat developed therein will be manifested in that portion of the circuit which is exterior to the generators, which end I attain by connecting two or more generators together in series, and then connecting the terminals of this series with each other by a conductor having a resistance greater than the total internal resistance of all the generators in the series.

The object of the third part of my invention is to insure uniformity of electro-motive force between the several dynamo-electric generators in the series, to the end that a perfectly uniform current may traverse the entire system, and this I attain by connecting two or more such generators together in endless series, in the manner hereinbefore stated, and by providing mechanical connections between the several rotating armatures of the respective generators, whereby the said armatures are compelled to rotate in unison with each other as well as in the same direction.

The object of the fourth part of my invention is to supply one or more working-circuits with a uniform and constant electric current, which end I attain by connecting two or more dynamo-electric generators together in endless series, in the manner hereinbefore stated, and connecting said working-circuits therewith in multiple arc.

In the accompanying drawings, Figure 1 is a theoretical diagram representing a system of dynamo-electric generators and working-circuits embodying my improvements, and Fig. 2 is a diagram illustrating the manner in which two or more generators are coupled together, both electrically and mechanically.

Referring to Fig. 1, A, B, and C represent three dynamo-electric generators, which may be of any suitable or well-known construction. The form of generator which I prefer to employ has its component parts arranged upon the principle shown in the diagram, consisting of a rotating armature enveloped in coils of wire, which moves within the magnetic field of stationary or field magnets. The electric circuit is continuous through the armature and the field-magnets of each generator, the arrangement being that ordinarily made use of in what are termed "single-current" machines.

In Fig. 1 the three generators A, B, and C are connected together in an endless series. The positive pole of generator A is connected to the negative pole of B, the positive pole of B to the negative pole of C, while the positive pole of C is again connected by the conductor D to the negative pole of A. If, therefore, the armatures of the three generators A, B, and C be simultaneously set in rotation by the application of a sufficient force, and be made to turn in the same direction and at the same speed, the electric current generated by each armature will pass through its own field-magnets, and also through the armatures and field-magnets of each of the other generators, in a continuous circuit. If the resistance of the conductor D be made somewhat greater than the combined internal resistance of the series of generators A, B, and C, the heat generated in the circuit will appear in the said conductor and not within the generators. In order to utilize the currents thus produced for telegraphic or other purposes, the exterior or working circuits are to be connected with the hereinbefore-described system of generators in parallel or derived circuits, or, in other words, in multiple arc with the shunt-conductor D. In case the work to be done consists, for example, in supplying electricity for operating two or more telegraph-lines, the positive pole of the generator C (see Fig. 1) is connected with the earth at G, by means of a wire or other conductor, $g$, while two or more telegraphic lines, H I, are connected with the negative pole of the generator A at the junction therewith of the shunt-conductor D, which extend to the distant station, where they are connected with the earth at G'. These lines may be equipped with the usual telegraphic apparatus, such as keys $k\,k$ and receiving-magnets $m\,m$, in a manner well understood.

It is essential, to insure the successful and satisfactory operation of the hereinbefore-described system, that the armatures of the several dynamo-electric machines should rotate in the same direction and in unison with each other. This may conveniently be effected by arranging the generators in the manner illustrated in Fig. 2, which is a theoretical representation of two such machines coupled together electrically and mechanically.

$a$ and $b$ represent the armatures of the respective dynamo-electric machines A and B. These armatures may be mechanically coupled together in any suitable manner, the simplest way being to place the machines alongside each other, as shown in the figure, and mount their armatures upon one and the same shaft, E, which may be driven by a pulley, $e$, and a belt proceeding from any suitable source of power. When arranged in this way it is better that the breaks in the respective commutators should be so arranged as to alternate with each other, as under this arrangement the absolute uniformity of the current in the system is more easily maintained.

By tracing the wires of the helices of the dynamo-electric machine and armature, as theoretically shown in the diagram, Fig. 2, it will be seen that both machines are wound in the same direction and have similar polarity, and consequently that their positive and negative terminals will lie in the same direction. The conductor D connects the negative pole of the generator A with the positive pole of the generator B, and fulfills precisely the same function as the shunt-conductor D in Fig. 1, while the positive pole of the generator A is connected with the negative pole of the generator B by a conductor, F. The arrangement of the conductor $g$ and the lines H and I are precisely the same in Fig. 2 as in Fig. 1.

When two generators are coupled together in the manner hereinbefore shown and described in connection with Fig. 2, the point of maximum negative potential in the system is situated at the negative pole of the generator A, and at the point where the circuits H and I are joined. The point of maximum positive potential is at the positive pole of the generator B, at the point where the earth-conductor G is attached. There are also two points of minimum or zero potential, one of which is in the middle of the shunt-conductor D, and the other in the middle of the conductor F, in each case at or near the point indicated by a small cross on the wire in Fig. 2.

The organization of dynamo-electric generators and circuits hereinbefore described may be employed for various useful purposes. It is especially well adapted to supplying a large number of telegraphic lines with electric currents, and to the production of the electric light by means either of incandescent or arc lamps, especially when these are arranged in multiple arc, for the reason that the electromotive force of the generators is automatically regulated according to the consumption of electric power in the working-circuits. The principle upon which this automatic regulation is effected has been set forth in my former Letters Patent, hereinbefore referred to, and consequently need not be reiterated here.

I claim as my invention—

1. The combination, substantially as hereinbefore set forth, of two or more dynamo-electric generators connected together in an endless series, the positive pole of one generator being connected to the negative pole of the next.

2. The combination, substantially as hereinbefore set forth, of two or more dynamo-electric generators connected together in series, the positive pole of one generator being connected to the negative pole of the next, and a conductor having a resistance greater than the total internal resistance of the series of generators which connects the positive and negative terminals of the series with each other.

3. The combination, substantially as hereinbefore set forth, of two or more dynamo-electric generators connected together in endless series, and a mechanical connection between the several armatures of the said dynamo-electric generators, whereby they are caused to rotate in unison and in the same direction.

4. The combination, substantially as hereinbefore set forth, of two or more dynamo-electric generators connected together in endless series, and one or more working circuits connected therewith in multiple arc.

In witness whereof I have hereunto set my hand this 15th day of January, A. D. 1881.

ORAZIO LUGO.

Witnesses:
FRANK L. POPE,
MILLER C. EARL.